United States Patent [19]

Lapeyre

[11] Patent Number: 4,488,702

[45] Date of Patent: Dec. 18, 1984

[54] ROLLING DIAPHRAGM METERING VALVE

[76] Inventor: James M. Lapeyre, P.O. Box 150699, New Orleans, La. 70150

[21] Appl. No.: 537,079

[22] Filed: Sep. 29, 1983

[51] Int. Cl.³ ............................................. F16K 31/12
[52] U.S. Cl. .................................. 251/46; 251/DIG. 2
[58] Field of Search ................ 251/30, 46, DIG. 2, 251/61.1; 137/625.3

[56] References Cited

U.S. PATENT DOCUMENTS

| | | | |
|---|---|---|---|
| 2,623,542 | 12/1952 | Obermaier | 251/30 |
| 2,977,972 | 4/1961 | Billeter et al. | 251/DIG. 2 |
| 3,206,159 | 9/1965 | Anderson et al. | 251/46 |
| 3,712,578 | 1/1973 | Dawson | 251/46 |
| 3,974,849 | 8/1976 | Dawson | 251/46 |
| 3,994,314 | 11/1976 | Hartley | 251/DIG. 2 |
| 4,013,091 | 3/1977 | Hudson | 251/46 |
| 4,125,127 | 11/1978 | Harter | 251/DIG. 2 |
| 4,132,237 | 1/1979 | Kennedy | 251/46 |
| 4,258,746 | 3/1981 | Hudson | 251/46 |
| 4,390,036 | 6/1983 | Athanassiu | 251/DIG. 2 |

*Primary Examiner*—Daniel J. O'Connor
*Attorney, Agent, or Firm*—Thomas S. Keaty; Alexander F. Norcross

[57] ABSTRACT

An improved metering valve, or flush valve, incorporates a rolling diaphragm mechanism of a cylindrical elastromeric material providing a smoothly transitioning flow rate control from the full open to the full close position. The rolling diaphragm sealing means is actuated by a floating cup driven by the differential pressure between the valve fluid inlet and an intermediate actuation control chamber. The valve control is spring biased to the normally closed position and is actuated by dumping all fluid from the control chamber through a poppet mechanism which is triggered mechanically through a sealing diaphragm. Upon dumping fluid from the metering chamber, the actuating cup is compressed by the pressure of the inlet fluids to roll the diaphragm to a substantially open position. A metering orifice within the actuating cup passes fluid from the inlet at a controlled rate to the metering chamber which, by the transfer of fluids through the metering orifice, is gradually filled with fluid and expands moving the rolling diaphragm towards the sealingly closed position. The amount of fluid passed is substantially a function of the size of the metering orifice. The metering orifice has a range in sizes. The design of the valve is such that the dynamic pressures across the rolling diaphragm are essentially in balance during actuation and closure, thus the closing bias can be established with a relatively weak spring mechanism or the like.

7 Claims, 6 Drawing Figures

ROLLING DIAPHRAGM METERING VALVE

BACKGROUND OF THE INVENTION

This invention relates to valves for controlling the flow of a liquid wherein the valve passes a predetermined quantity of liquid and then automatically closes. These valves are known alternatively as metering valves or flush valves.

Metering valves in common use are generally of two types. The first type, seen in such applications as commercially available toilets and the like, consist of providing a liquid holding chamber calibrated or sized to hold the metered quantity of a liquid, together with a float valve or other level sensing mechanism designed to detect when the chamber has been filled to the level corresponding to the quantity desired. This controls the intake of liquid to the chamber until the desired quantity of liquid is available and held within the chamber. The valve is also provided with some form of dump mechanism for dumping all, or substantially all of the fluid, from the chamber into the desired outlet. Such valving systems are simple, easily constructed and have proven highly reliable. However, they have several disadvantages; they essentially are limited to metering a substantial quantity of liquid; by their nature, since they require either an air-liquid or a dual-density liquid interface in order to trigger the standard level sensor mechanisms, they are inherently non-hermetically sealed.

A second form of metering valve typically utilizes some form of internal cylinder, or moving mechanism, which traverses from an open to a closed position by the pressure of the liquid being supplied to the valve, and the speed of which traversal is controlled by a bleed orifice. The movement of the cylinder, or mechanism, is in turn used to actuate the valve.

Typical prior art valves of this type, while they are hermetically sealed, utilize some form of sliding valve-gate or diaphragm mechanism. As the forces available within such valve mechanisms are insufficient to actuate the valve against significant differencial pressure, these valves also have the significant disadvantage that they are unable to operate against very large pressure differentials from inlet to outlet, and they are severely restricted in the ability to design in various metering rates because of physical limitations within the valve on the metering or bleed orifice sides caused by the overall mechanical arrangement of the interior of the valve body.

SUMMARY OF THE INVENTION

This invention provides an improved metering valve which may be of of the hermetically sealed variety by providing an improved combination of valve elements so as to allow a wide range of switching pressures to be controlled and allow a wide range of metering rates to be established, all within a valve of the same general overall physical dimensions, flow control capacity, and configuration.

The valve uses an elastomeric rolling diaphragm mechanism to achieve the widest possible flow control range within a restricted area by using the rolling diaphragm to seal and open a substantially cylindrical flow-gate which provides a flow rate independent of the diameter of the valve.

The rolling diaphragm mechanism is balanced as to forced across the rolling diaphragm. By the nature of a rolling diaphragm mechanism, the force required to actuate or to close the rolling diaphragm is essentially the elastic resistance of the diaphragm to movement and the mechanical hysteresis induced within a particular cylindrical rolling diaphragm by its compression from a larger diameter outward cylinder to a lesser diameter inward cylinder as the diaphragm is moved. These forces serve to balance the rolling diaphragm against vibration or chatter by inducing a degree of hysteresis into its operation, yet preserve the overall ease of actuation and small forces required for moving a rolling diaphragm against pressure so a relatively simple positioning bias means such as a spring can be used to bias the valve to a desired position. In the case of the design disclosed herein, that position is closed.

The diaphragm is actuated by means of a moving actuation cup which moves in response to differential pressure between the inlet fluid supply to the valve and an enclosed interior metering chamber within the valve. The metering chamber is connected to the inlet fluid flow by means of a metering orifice; the orifice's size is controlled so as to pass an essentially constant fluid flow over time given the pressure supplied to the inlet of the valve. When the valve is in the normally closed position, the metering chamber, being in fluid communication with the inlet of the valve through the metering orifice, is at the inlet fluid pressure; the actuating cup position is established through a spring bias.

The valve is actuated by means of a mechanical poppet or internal dump means which upon actuation, rapidly dumps substantially all fluid from the metering chamber. The dump rate significantly exceedes the rate of flow through the metering orifice. The pressure from the inlet fluid flow collapses the metering chamber, rolling the rolling diaphragm to a substantially open position, and permitting fluid flow through the valve. The dump poppet is then either closed automatically by the collapse of the metering chamber or closed by the valve actuating mechanism; closure is a design variable depending upon the intended use of the metering valve. Upon closure of the dump, the metering chamber then is filled at a rate established by the flow rate of the metering orifice from differential pressure across the actuation cup established by a bias means such as a spring; as the metering chamber fills, the rolling diaphragm is moved from its open, flow producing position to the closed, off position.

The use of a rolling diaphragm produces a smooth transition from the fully closed to the fully opened and the fully opened to the fully closed position, thus producing both a smooth, continuous onset and a smooth tapering off of fluid flow during actuation. The rates of such onset and termination are established by the mechanical design of the valve and the length of the flow passages or orifices which are sealed off by the rolling diaphragm. Longer orifices are closed at a slower rate and provide a slower smother transition of fluid flow. Substantially short flow orifices are closed rapidly by transitioning of the rolling diaphragm and provide an essentially rapid turn on and turn off of fluid flow. The rolling diaphragm mechanism itself is balanced as to pressure, with the inlet fluid flowing through the metering orifice into the metering chamber, providing back pressure supporting the rolling diaphragm. Thus, at all points at its actuation cycle, the pressure across the rolling diaphragm is substantially zero. This, together with the resistance to rapid movement induced within the diaphragm mechanism by its material, as described above produces a valve sealing mechanism which is substantially resistant to vibration, chatter or other adverse control affects.

The design of this rolling diaphragm is such that it maintains the minimum operating force requirement typical of diaphragm sealed valves, and thus, despite substantial inlet pressures, the diaphragm is capable of controlling the valve with a relatively small biasing force to establish its normally open or normally closed position.

As will be obvious to those skilled in the art of valve analysis and design, it is the biasing force established by an internal biasing spring within the metering chamber which, together with the diameter of the metering orifice, determines the rate of closure and thereby the amount of fluid passed through the valve at each actuation. The valve designer may for any given valve requirement through a combination of flow orifice size, flow orifice length, bias spring rate, and metering orifice establish within a very large possible range of combinations, a desired fluid flow rate, a desired total fluid quantity, and, independently, the desired control actuation time from full flow to zero flow in both the open and the closed position.

Thus, it is an objective of this particular invention to provide a metering valve having a significantly wider range of control possibility within the same basic physical valve size, allowing a series of valves of the same identical physical external size to be built giving a variety of, and choice of metering flow quantities, flow rates, and transition times.

It is a second object of this invention to provide an improved metering valve which is essentially hermetically sealed, having no moving parts seals extending through the valve body and thus substantially immune to leakage.

It is a third object of this invention to provide a metering valve which may be actuated by external magnetic forces, thus permitting a valve with a substantially strong body to be built as an in-line, hermetically sealed metering valve within an existing system, which can be controlled either by mechanical actuation means or by digital control technology.

It is also an object of this invention to provide a metering valve which provides the widest possible range of flow rates and control rates within a fixed external size.

It is a further object of this invention to provide a metering valve which can be essentially sealed within a closed hydraulic system in an inaccessible or relatively inaccessible location and which requires no maintenance nor access due to leaks, or failures.

It is a further object of this invention to provide a metering flow valve which, being enclosed within an otherwise sealed hydraulic system, is essentially immune to and resists the creation of hydraulic chatter, hydraulic jamming, or hydraulic surges by being both a heavily damped internal valve mechanism and by providing a smooth, controlled transition during actuation.

These objects and others, as will be apparent to those skilled in the art, are more fully revealed in the detailed description of the preferred embodiments of the invention which follows.

MATERIAL INFORMATION DISCLOSURE

Sielaff, U.S. Pat. No. 3,642,026 shows a metering valve in which the sealing mechanism is a flexible diaphragm which is displaced between a closed and an open position by a spring loaded piston mechanism. The diaphragm is not rolled back upon itself and the pressures across the diaphragm are unbalanced, controlled by the spring loaded piston.

Boyle et al, U.S. Pat. No. 3,216,453 shows a valve wherein the sealing means is a flexible metal tape, requiring, for adequate sealing, an additional tensioning means against the metal tape to prevent leaks. The metal tape lacks any elastomeric or stretch capability. Valve acuation arequires an external movement means projecting through the valve body requiring a seal.

Harter, U.S. Pat. No. 4,125,127 shows a rolling diaphragm sealing mechanism utilizing a spring loaded piston actuating mechanism and a balanced pressure across the rolling diaphragm.

Brumm, U.S. Pat. No. 3,690,344 shows a flexible cylinder diaphragm. The actuation means is not shown but requires at least one moving seal. The diaphragm is unblanced across pressure and has no inner diaphragm suport. Brumm also discloses at greater length and in his claims a non-rolling diaphragm in the form of a displacement diaphragm mechanism switched by differential pressure.

Robins, U.S. Pat. No. 3,727,623 shows an alternate flexible diaphragm mechanism.

Wurzer, U.S. Pat. No. 4,251,553 shows the use of a rolling diaphragm not as a valve sealing mechanism but as a flexible seal, preventing leakage around the actual sealing face which is a standard rigid poppet. Wurzer discloses and distinguishes within the overall class of rollng diaphragm mechanisms between diaphragm which is rolled from one extension to another and a diaphragm which maintains an essentially constant curvature through its mkovement, and discloses that the strains upon the diaphragm, the internal forces involved, and the war on the diaphragm make these two distinctive and different mechanical apparatus.

Olson, U.S. Pat. No. 4,111,221 discloses the use of differential pressure on a rolling diaphragm to actuate a valve.

Billeter, U.S. Pat. No. 3,021,861 shows a split rolling diaphragm valve having a metalic diaphragm using the force of the metalic diaphragm against longitudinal orifices to resist liquid flow requiring thereby separate gaskets to seal against leaks. Billeter discloses the advantages of a rolling diaphragm over a poppet valve mechanism with respect to the forces rquired to actuate each mechanism, and discloses the advantages of a rolling diaphragm over a slide valve mechanism by disclosing the differences in friction and leakage between the two mechanisms. Billeter discloses that a rolling diaphragm valve is benefited by symmetry within the rolling diaphragm. The mechanism disclosed requires a split diaphragm as the metal mechanism is noncompressible and is not suitable for a full circle or cylinder rolling diaphragm. In addition, the mechanism disclosed in Billeter has no hysteresis forces involved in the bending and flattening of the rolling diaphragm, and therefore the energy levels and forces are different between Billeter and a cylindrical, elastomeric rolling diaphragm.

Longworth, U.S. Pat. No. 3,877,478 discloses the use of magnetic coupling from a first valve to drive a second valve. The magnetic coupling mechanism discloses a linear repulsion between two magnetic poles.

Wittmann, U.S. Pat. No. 2,669,242 shows a flexible diaphragm valve actuator, wherein the diaphragm is not the valve seal. The diaphragm is actuated by differential pressure. Wittmann additionally discloses the use of a permanent magnet as a pressure-sensitive catch within a hermetically sealed valve.

Waddell, U.S. Pat. No. 2,265,201 in 1939 disclosed pressure across a diaphragm as an actuating method for sealing a valve.

Miller, U.S. Pat. No. 2,629,401 shows a metering valve having a free floating piston with side clearance. The piston is actuated by changing pressure metered by opening and closing orifices. The metering orifice in this mechanism is flowed pass the piston clearance to move the piston from an open to a closed position. The metering clearance is restricted to a range of 0.001 to 0.003 and is a function of the overall diameter of the valve. It is essentially invariant within a given size of valve. Miller also discloses magnetic control of a plunger to actuate the valve. The mechanism in Miller has a non-positive closure; the only forces tending to close the valve are turbulent flow around the valve seat, differential pressure, and the magnetic plunger.

Inada, U.S. Pat. No. 4,216,938 shows an electromagnetically actuated sliding valve having spring bias and a solenoid on/off magnet for actuation. In order to achieve a hermetically sealed valve, Inada's mechanism requires that an electromagnetic coil be placed and immersed within the liquid in the valve body.

Davis, U.S. Pat. No. 2,490,420 shows the cooperative use of differential pressure across two independent diaphragms to actuate a alve as a function of two control inputs.

DETAILED DESCRIPTION OF THE PREFERRED EMBODIMENT

Figure 1:
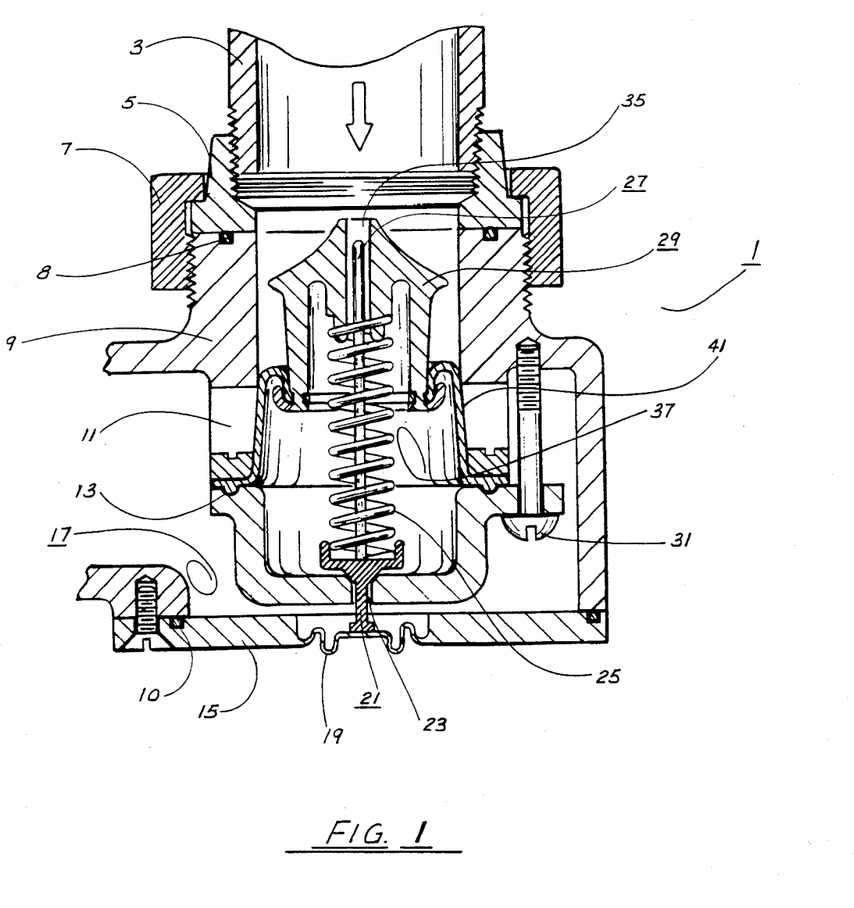
FIG. 1 is a side sectional view of the rolling diaphragm metering valve in the closed position.

Referring now to FIG. 1, the cross section of the overall Rolling Diaphram Metering Valve 1 is shown in an essentially vertical position for convenience of the description to follow. It is to be understood throughout that the adjectives vertical, horizontal, left and right refer to the directions as shown upon the drawings. The valve itself is designed and, as will be apparent to those skilled in the art, is capable of operation in any position. As will be hereinafter described, it is adaptable to construction both in an inline version, which is particularly adapted to remote control and to insertion into an already existing piping or plumbing system, and in a version adapted for direct mechanical push-button actuation.

The valve comprises primarily an inlet pipe section 3 connected to a source of fluid under pressure. The inlet pipe section 3 in turn comprises an inlet pipe engaging clamp 5 for connection of the overall valve to an existing inlet pipe not shown. Flange 5 is connected to the inlet pipe 3 by pipe threads. Clamp means 7 holds flange 5 into contact with valve body 9. The inlet pipe engaging flange 5 and the valve body 9 is connected to the inlet pipe 3 by means of a pipe clamping means 7 which can be any of the standard torquable, screwing section clamps as well known to the art. An inlet O-ring hermetic seal 8 is provided at the breaking interface of the pipe clamping means 7 and the inlet pipe engaging flange 5. It is also possible where materials permit to have a soldered or fused joint between clamp rings 5 and pipe 3. In the case of plastics, this can be solvent bonded and in the case of copper, this can be solder sweated. Compression of the apparatus consisting of the inlet pipe engaging flange 5 and the pipe clamping means 7 so displaces the inlet O-ring seal 8 so as to prevent any leakage and provide a hermetically sealed valve inlet. It is obvious that this is but one of a number of various inline hermetically sealed connection means, as are well known to those engaged in the art of fluid piping and connections. The clamping means comprising the inlet pipe engaging flange 5, and the pipe clamping means 7 secure, to the inlet pipe section 3, the rolling diaphragm metering valve upper, valve body 9 which forms the upper outer casing and fluid enclosure for the overall diaphragm metering valve 1.

This upper valve body 9 is sealingly connected to a lower valve body 15 as will be described in more detail. The inner section of the rolling diaphragm metering valve upper valve body 9 comprises an essentially cylindrical cross-section, extending the inlet pipe section a distance into the valve body; at the inwardly projecting end of the upper valve body 9 are provided a plurality of radially disposed flow orifices 11 for passage of fluid as will be hereinafter described. Within the valve body 9 and capping off the upper valve body 9 is a metering chamber lower section 13, hermetically sealed across the end of the upper valve body 9 so as to restrict all flow of fluid to the passages formed by flow orifices 11. Hermetically fastened or sealed to an outer edge of the outer extension of the upper valve body 9 is the metering diaphram lower valve body 15, which encloses the metering chamber lower section 13 and thereby forms an outlet chamber 17 for the flow of fluid to a valve outlet as will be further described.

The metering diaphragm lower valve body 15 is hermetically sealed to the upper valve body 9 by the lower hermetic seal 10 which may be any of the known seals such as a circular O-ring seal with screw clamping or the like. The metering diaphragm lower valve body 15 together with the outer surface of the metering chamber lower section 13 and the outer walls of the upper valve body 9 collectively form the rolling diaphragm metering valve outlet chamber 17.

The metering valve upper valve body extension 9 and the metering chamber lower section 13, as clamped together such as, for instance by metering chamber clamp screw 31, form an inner metering chamber 37.

Within the inner metering chamber 37 is a flow control means which comprises a diaphragm actuating cup metering pin 27 axially positioned along the cylindrical axis of the inner metering chamber 37, extending so as to uniformly obstruct a metering passage 35 throughout the movement of a diaphragm actuating cup 29 from a position essentially below the opening of the flow orifices 11 to a position essentially above the flow orifices 11. This cup metering pin 27 maintains a uniform flow cross section within metering passage 35 while diaphragm actuating cup 29 moves.

As would be obvious to those skilled in the art, the radial positioning of the diaphragm actuating cup 29, at all positions in its vertical motion, is established by the forces established by the folding of the rolling diaphragm 41. In turn this radial positioning of the diaphragm atuating cup 29 maintains the metering pin 27 uniformly within the metering passage 35. The net opening established within metering passage 35 by the radial diameter or size of the metering pin 27 establishes the net flow rate through the metering passage 35 and thus the speed with which fluid will pass from the valve inlet into the metering chamber 37.

It can thus be seen that if the metering pin 27 is made removable or interchangeable that varying metering flow rates may be established by simply replacing a metering pin 27 with a second metering pin 27 of a differing diameter. Further, as will be obvious, based on the subsequent discussion herein of the operation of the valve 1, the rate of closure of the valve may be modulated by providing varying diameters at varying positions along the metering pin 27. In any event, the net opening formed by the metering passage 35, which is at all time of somewhat greater circumference than the outer circumference of the metering pin 27, permits sufficient fluid flow pass and around the metering pin 27 through the diaphragm actuating cup 29 so as to provide a measurable flow of fluid over a certain period of time for reasons as will be hereinafter explained.

It should also be obvious that the metering pin 27 provides a second function in that its being fixed with respect to the actuating cup 29 creates a constant relative motion during valve actuation between metering pin 27 and metering passage 35, thus dislodging any buildup of scale or other foreign particles which otherwise tend to clog metering passage 35 gradually rendering the valve unworkable. Thus, metering pin 27 provides, in addition to its timing function, a self-cleaning function.

At a point at low center location on the metering chamber 13 lower section is found a fluid dumping passage 23 which provides a fluid passage from the inner metering chamber 37 to the valve outlet chamber 17. Within the metering poppet flow passage 23 is found axially disposed therethrough an elongated, movable metering poppet 21 having an uppermost and a lowermost position relative to the metering chamber lower section 13. In its uppermost position, the metering poppet 21 is substantially removed from, having an inserted stem of a circumference substantially less than the inner circumference of the metering poppet flow passage 23, thus permitting the dumping flow of a volume of fluid from the inner metering chamber 37 to the valve outlet chamber 17. The poppet 21 when pushed and unseated creates an opening across and immediate pressure differential between the valve outlet 17 and the metering chamber 37; the fluid within the chamber 37 is substantially immediately dumped by this pressure differential allowing the valve to open relatively quickly. In its lowermost position the metering poppet 21 is provided with an expanded cross section such that it substantially blocks and stops all flow of fluid through the metering poppet flow passage 23. The metering poppet 21 is maintained in a substantially downward position by the pressure of a provided metering poppet return spring 25 which has a lower end pressably affixed to the metering poppet 21 forcing the metering popper 21 into a substantially downward position. The metering poppet return spring 25 in the preferred embodiment is then extended upwards, spiralling around the diaphragm actuating cup metering pin 27, having a second end pressably engaged to the diaphragm actuating cup 29, providing thereby an upward force or bias on the diaphragm actuating cup 29 equal to the downwardly extending force on the metering poppet 21.

It can be seen that the downward force of the metering poppet 21 provided by the metering poppet return spring 25 is substantially greater when the diaphragm actuating cup 29 is in a lower disposed position, than the force on the metering poppet 21 when the diaphragm actuating cup 29 is in an upper position.

Figure 3:
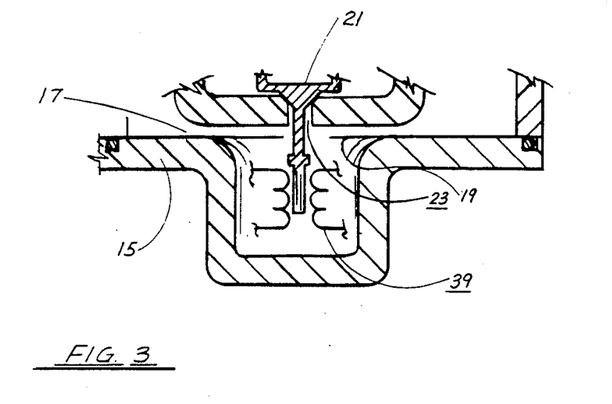
FIG. 3 shows an alternative actuation means replacing the push-button actuation.

A section of the metering poppet 21 extends through the metering poppet flow passage 23 and is contacted by a hermetic seal push button diaphragm 19, which may be disposed as a continuously formed part of the rolling diaphragm metering valve lower valve body 15, so that it may be an integral component of the lower valve body 15. This push-button diaphragm 19 is flexible and is adapted and arranged so that a push upon the diaphragm tends to force the poppet 21 against the force of the poppet return spring 25 to an upward more open position. When no force is applied to the diaphragm, the force of the poppet return spring 25 holds the poppet 21 in a closed position, blocking flow through the metering poppet flow passage 23. Turning to FIG. 3, an alternate mechanical arrangement provides an electrically actuated solenoid 39 of design well understood to those skilled in the art.

Actuation of the solenoid 39 by an external electrical signal forces the solenoid 39 against the metering poppet 21; this in turn forces metering poppet 21 upwardly against the force of metering poppet return spring 25, opening the metering poppet flow passage 23 as before described. It is to be noted that in this embodiment the solenoid 39 is contained within lower valve body 15 and thus there is no need for actuation through a diaphragm 19, the entire solenoid assembly 39 being contained hermetically within the overall valve 1.

Within the area enclosed by the upper valve body 9 and the metering chamber lower section 13 is provided an essentially cylindrical rolling diaphragm 41 of a flexible or elastomeric material forming an upward extension of the inner wall of the metering chamber lower section 13, being sealingly connected at a line adjacent to a joint or mating of the matering chamber lower section 13 and the upper valve body 9, and vertically arising to and being hermetically sealed at an upper end to the perimeter of the rolling diaphragm metering valve diaphragm actuating cup 29. This diaphragm thus completes and forms, in conjunction with the metering chamber lower section 13, the rolling diaphragm 41, and the diaphragm actuating cup 29, an inner fluid chamber which is the inner metering chamber 37. It can thus be seen that the inner metering chamber 37 is fluidly connected to the inlet pipe section 3 through metering passage 35 and is fluidly connected to the valve outlet chamber 17 through the metering poppet flow passage 23 when the metering poppet 21 is in the unseated position. It can further be seen, as is obvious to those skilled in the art, that as the metering passage 35 is always open, and that as the actuating cup guidepost 27 remains substantially at all extensions of the actuating cup 29 within the metering passage 35, a uniform cross-section for the metering passage 35 exists at all positions of the diaphragm actuating cup 29. An essentially constant flow of fluid over time is thereby provided to the inner metering chamber 37.

It can further be seen that, as the diaphragm actuating cup 29 is positioned within the overall valve body by the force of differential fluid pressure between the inlet pipe section 3 and the inner metering chamber 37, the return force of the metering poppet return spring 25, and any spring forces involved in the bending of the rolling diaphragm 41. For any appreciably sized valve, the return spring 25 and the rolling diaphram 41 provide a relatively minor component to the overall dynamic positioning forces and thus the diaphragm actuating cup 29 maintains, at the upper most extension, consistent with maintaining an equal fluid pressure between the inner metering chamber 37 and the inlet pipe section 3.

The position of the diaphragm actuating cup 29 controls the upward extension of the rolling diaphragm 41, which is affixed to the lower end of the cup 29. When the diaphragm actuating cup 29 is at its uppermost position, the rolling diaphragm 41 is rolled along the inner wall of the inner portion of the upper valve body 9, closing off and sealing the flow orifices 11 from contact with fluid flow from the inlet pipe section 3 and preventing fluid flow into the valve outlet chamber 17. The continuing fluid communication through the metering passage 35, and the fact that the diaphram cup 29 position at all times implies essentially equal fluid pressures between the inner metering chamber 37 and the inlet pipe section 3, means that there is equal fluid pressure across the wall of the rolling diaphrgam 41 resisting any tendency of fluid from inlet section 3 to displace the rolling diaphragm 41 and permit leakage through the flow orifices 11.

Figure 2:
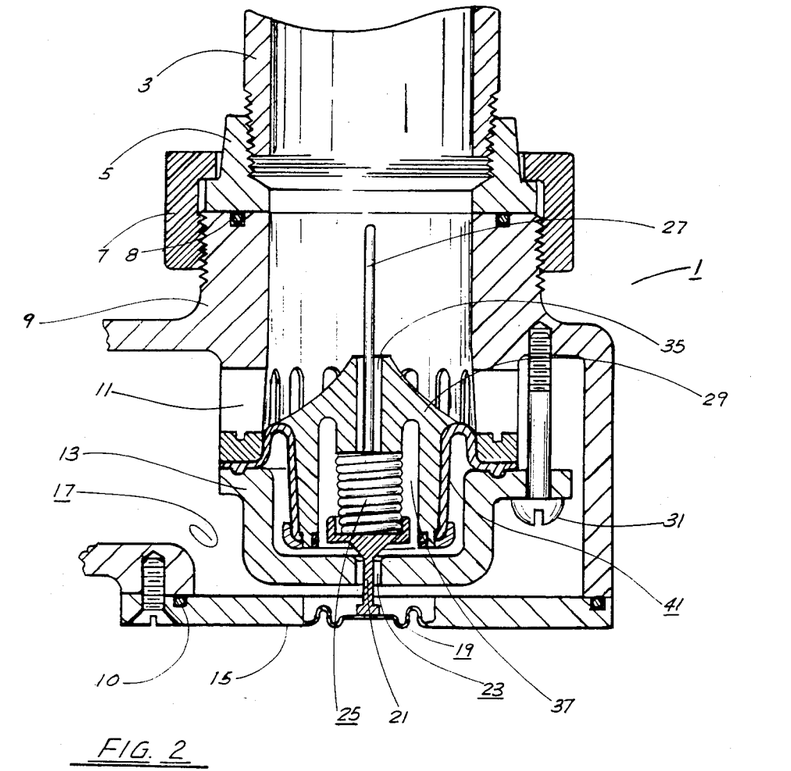
FIG. 2 is a side sectional view of the rolling diaphragm metering valve in the open position.

When the fluid pressures are such that the diaphragm actuating cup 29 is lowered, the rolling diaphragm 41 is pulled by the cup in a downward direction, opening flow orifices 11 to fluid communication between the inlet pipe section 3 and the valve outlet chamber 17, permitting the passage of fluid through the valve.

It can thus be seen that the primary controlling element initiating actuation of the valve 1 is the displacement of the metering poppet 21 from its normally closed position to its second open position. There are numerous alternative actuating methods for positioning the metering poppet 21 with respect to the metering flow passage 23. In addition to direct or solenoid pressure upon the push-button diaphragm 19.

Figure 4:
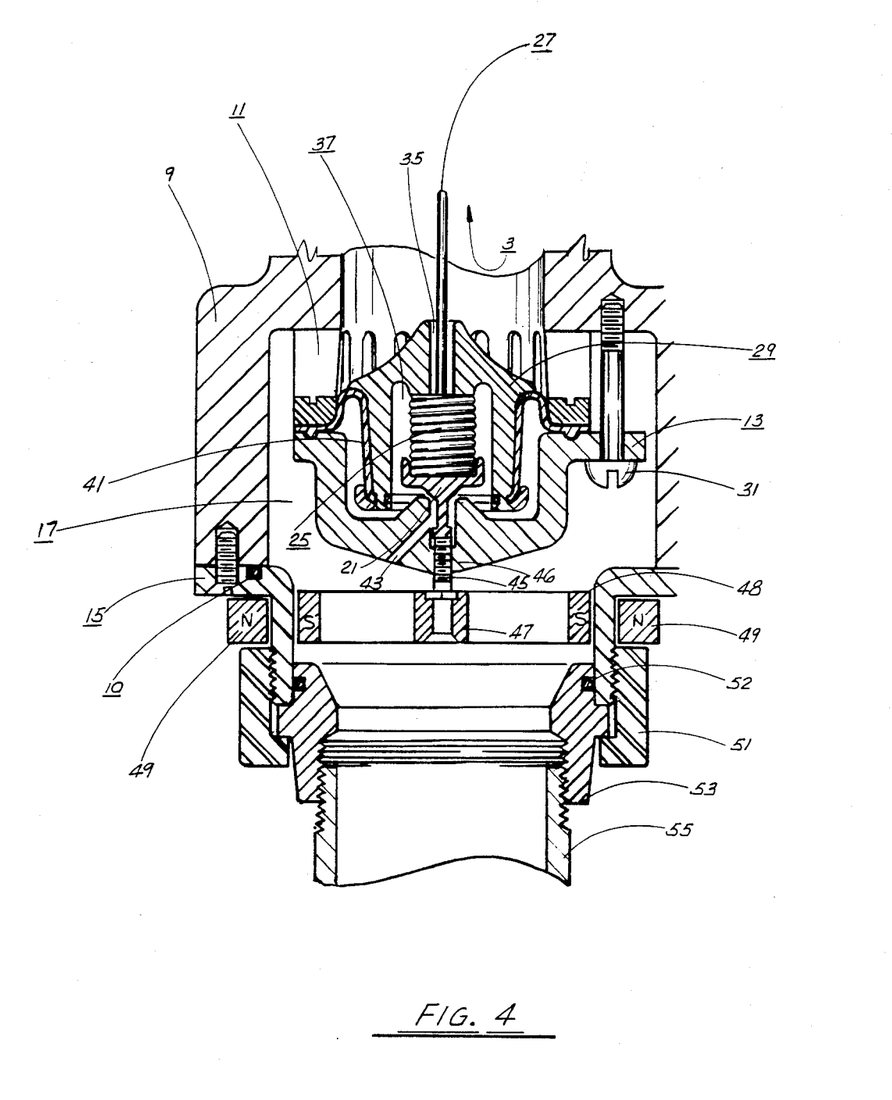
FIG. 4 shows a second alternative actuation means involving a hermetically sealed magnetic actuator providing an inline capability for the rolling diaphragm metering valve.

Referring to FIG. 4, one alternative is shown wherein the metering poppet 21 is not positioned by the force of a return spring 25, but rather by direct displacement by means of the turning of a metering poppet actuating screw 45 which positions the poppet 21 by turning within a metering poppet actuating screw guide means 46 provided in the wall of the metering chamber lower section 13. Turning of the poppet actuating screw 45 within the guide means 46 will result in the movement of the metering poppet 21 to an uppermost or a lowermost position depending upon the direction of turn. An alternate metering chamber dump passage 43 is required inasmuch as the actuating screw guide means 46 effectively prevents fluid flow around the axis of the metering poppet. This alternate metering dump passage 43 is provided for flow of fluid from the inner metering chamber 37 to the valve outlet chamber 17 when the metering popper 21 is actuated to an uppermost position by the poppet actuating screw 45 being turned.

One means of turning the metering actuating screw 45 and thus actuating the metering pivot 21 is as shown in FIG. 4 wherein the valve further comprises a metering poppet magnetic drive 47 rotatably connected to the metering poppet actuating screw 45. This metering poppet magnetic drive 47 comprises a wheel or rim 48 having a plurality of alternating magnetic poles of any standard permanent magnetic material; in practice the rare earth ceramic magnets have been found satisfactory. Disposed circumferentially around the outside of the overall metering valve 1, in the plane of the poppet magnetic drive 47 and circumferentially around it, is an external magnetic driving means 49 which may comprise either a mechanically driven ring of permanent magnetics or a plurality of electro magnets sequentially driven by any of the standard electro magnetic controls well known to the art.

Figure 5:
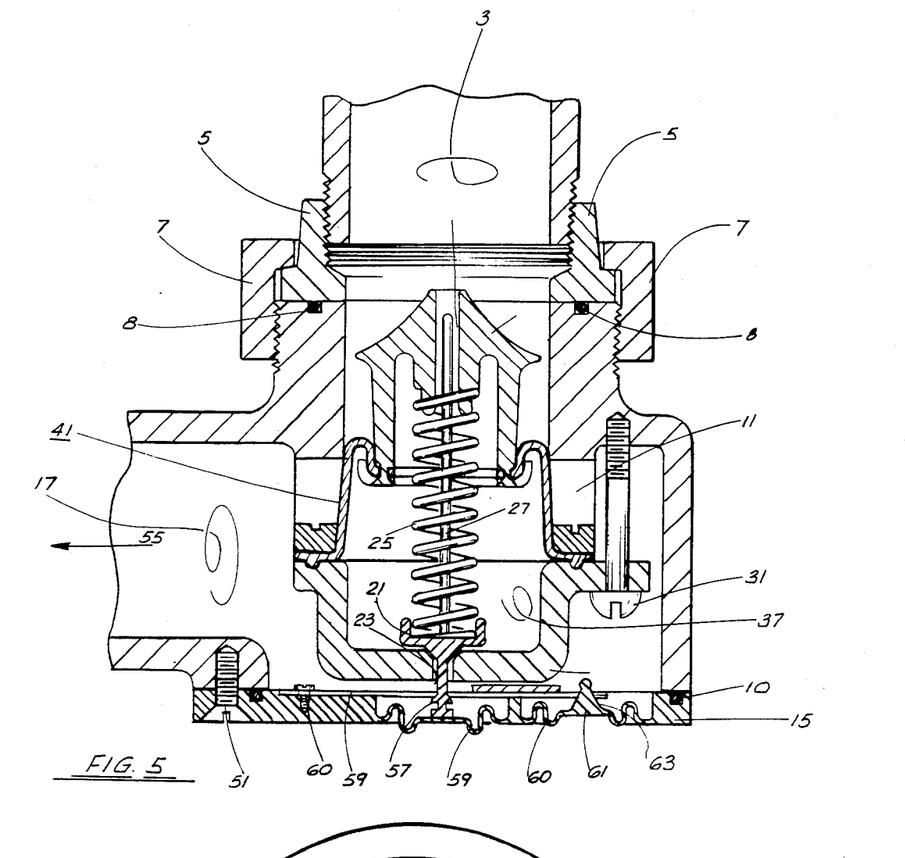
FIG. 5 shows an alternate push-button actuating means having two push buttons for alternately locking the valve in an open and closed position.
Figure 6:
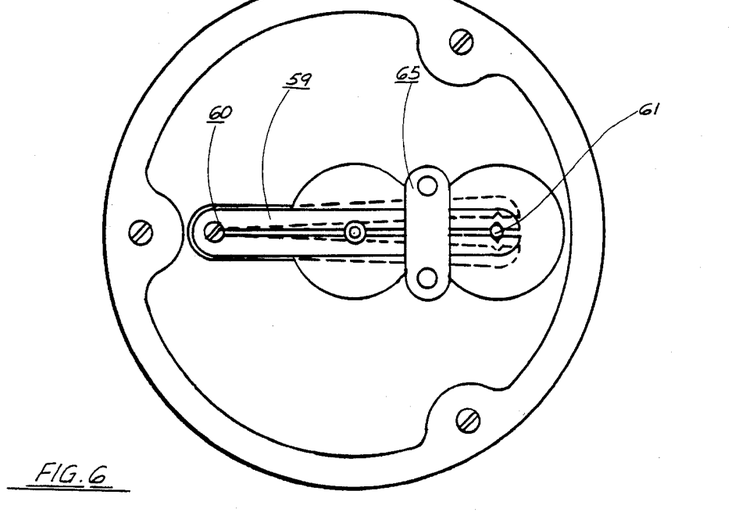
FIG. 6 shows an interior frontal view of the alternate locking push-button mechanism showing a means for latching the push buttons in the open and closed position.

An additional alternate actuating means is shown wherein the rolling diaphragm metering valve metering poppet 21 is provided, as shown in FIG. 5, with an angled, circumferentially raised poppet locking shoulder 57 adapted to and passing through an actuating poppet lock clamp 59. The lock clamp 59 is a spring loaded clamp, such as a split clamp as shown, displaced by the movement of the angled portion of the metering poppet locking shoulder 57, and springing back to clamp beneath the straight section of the metering poppet locking to shoulder 57 so as to prevent the return of the locking metering poppet 21 to a closed position. In the embodiment shown, the actuating poppet lock clamp 59 is spring clasped around an actuating poppet lock clamp fulcrum screw 60 and held in position by a clamp holddown plate 65. A second push-button diaphragm 60 is provided in line with the split lock clamp 59. The diaphragm 60 has, on its inner surface, a clamp actuating cam 61 disposed with respect to the split lock clamp 59 such that a clamp actuating opening shoulder 63 disposed upon the cam 61 separates the split portion of the lock clamp 59 as the second diaphragm 60 is pushed. This opening action and the design of the shoulder 63 is such that the actuating poppet lock clamp is expanded somewhat more widely than the outer edge of the metering poppet locking shoulder 57 when the second push-button diaphragm 60 is fully depressed, thereby allowing shoulder 57 to return, under spring bias 25, poppet 21 to its closed position.

In operation the valve is installed in an external pipe for the flow of fluid. The pressure of the poppet return spring 25, or the positioning of the poppet actuating screw 45, is such that the poppet 21 is in its lowermost position preventing fluid flow through the metering poppet flow passage 23 between the inner metering chamber 37 and the valve outlet chamber 17.

Fluid is provided under pressure through the inlet pipe section 3 to the valve. The open fluid communication through the metering passage 35 causes the fluid to fill the inner metering chamber 37 and the resultant of the equalized pressure forces upon the diaphragm cup 29 together with the return spring forces of the poppet return spring 25 causes the diaphragm 29 to remain in a substantially upward position.

As the diaphragm cup 29 is in its uppermost position, the rolling diaphragm 41 affixed to the bottom of the cup 29, and carried with it, is rolled across the faces of the flow orifices 11 preventing fluid communication from the inlet pipe section 3 to the valve outlet chamber 17. As has been mentioned, the structure of the metering passage 35 and the inner metering chamber 37 is such that the pressures across the rolling diaphragm 41 balance any tendency of the fluid pressure in the inlet pipe section 3 to push past the rolling diaphragm 41 and thus leak through the flow orifices 11. Thus, despite the overall flexibility of the rolling diaphragm 41, the valve is relatively insensitive to the fluid pressure being provided in the inlet pipe section 3.

The valve is actuated to an open position by transitioning the metering poppet 21 to an unseated position permitting fluid flow through the metering poppet flow passage.

In its simplest form, the valve 1 is actuated by pushing on the push-button diaphragm 19 either manually or by means of the actuating solenoid 39 or by any similar mechanism. The relatively minor resistance force of the poppet return spring 25 is readily overcome as the diaphragm cup 29 is in its uppermost position and thus the poppet return spring 25 at its least compressive state. The relative sizes and flow rates of the metering poppet flow passage 23 and the metering passage 35 are such that the metering poppet flow passage 23 supports a considerably increased flow rate over the metering passage 35; this is aided as the pressure in the valve outlet chamber 17 starts at essentially zero pressure and remains, due to the flow resistance of the structure within the valve, at all times at a pressure lower than the inlet pipe section 3. The inlet metering chamber 37 thus is rapidly dumped of fluid through the metering poppet flow passage 23.

Since the diaphragm actuating cup 29 will not support a fluid pressure differential, other than that established by bias means such as spring 25, between the inner metering chamber 37 and the inlet pipe section 3, it is displaced downward by the evacuation of the fluid. This downward displacement rolls the rolling diaphragm 41 in a downward direction, opening the flow orifices 11 to fluid communication between the inlet pipe section 3 and the valve outlet chamber 17, permitting fluid flow through the valve.

When the metering poppet is returned to the closed position, by releasing the push-button diaphragm 19 or by means to be described hereinafter, the flow of fluid through the metering poppet flow passage 23 ceases. The metering poppet 21 is strongly sealed against the metering poppet flow passage 23 by the now increased force of the metering poppet return spring 25 which is in a fully compressed position due to the downward displacement of the diaphragm actuating cup 29. The metering poppet 21 having closed, the full force of the metering poppet return spring 25 is now exerted in an upward direction against the diaphragm cup 29 establishing by biasing a pressure differential across cup 29. No fluid is exiting the inner metering chamber 37, the poppet 21 being closed. Fluid will enter the metering chamber 37 through the metering passage 35 due to the bias develped pressure differential; as a result the diaphragm cup 29 gradually returns to its uppermost position at a rate determined solely by the flow rate of fluid through the metering passage 35. This flow rate is a function of the cross section of the metering passage 35 as established by the metering pin 27 and the force of the metering poppet return spring 25 which provides the only differential bias force across the actuating cup 29.

The upward displacement of the diaphragm cup 29 rolls the rolling diaphragm 41 upwardly across the flow orifices 11, sealing them from the inlet pipe section 3 and stopping fluid flow through the overall valve 1.

As can be seen, the rate at which the diaphragm cup 29 rises controls the time the overall valve 1 remains open for fluid flow after the actuation of the metering poppet 21 ceases. Thus, for a design pressure load on the inlet pipe section 3, this valve 1 will pass a measured amount of fluid with each actuation based primarily upon the metering poppet return spring and the net cross-section of the metering poppet flow passage. Both of these factors have a relatively wide range of values aided by the use of a replaceable metering pin 27, as will be seen to those familiar with the art, and thus provide the designer with extensive design flexibility for predesigning the valve for any desired flow characteristics.

It is to be noted throughout that this passage of fluid does not involve the use of calibrated measuring chambers, of float valves, or any form of a side chamber of cavity which must be filled and then emptied while remaining at a constant volume to provide a calibrated amount of fluid flow. Thus, unlike the tank valves and float valves of the prior art, this metering valve may be installed in a hermetically sealed manner in line as has been before described. It does not depend upon the floating of an object between the interface of two different density media and, more importantly, it does not require the injection of air or the ability to breathe to the outside.

The alternative structures described above provide alternate actuating methods for the metering poppet actuating screw 45, providing various methods of actuating the valve so as to control both the on and the off position. As can be seen, the timed closure can be set either to provide for a substantial flow of a measurable volume of liquid or, alternately, a relatively faster rate can provide a smooth cutoff mechanism for what would otherwise be a straight on and off valve, where it is important to control the transitions in a hydraulic system between the on and off setting of a valve. Thus in the version having the metering poppet actuating screw 45, which is actuated by rotation, both the metering poppet flow passage 23 and the metering passage 35 are sized so as to control the passage of fluid from the inner metering chamber 37. The differential between the cross section of the metering poppet flow passage 23 and the metering passage 35 will determine the speed with which the inner metering chamber 37 is dumped of fluid and thus the speed with which the valve actuates on when the metering poppet actuating screw 45 transitions the metering poppet 21 to the open position. Likewise, the size of the metering passage 35, as hereinbefore explained, controls the speed of transition of the valve to the closed position once the metering poppet 21 is returned to its closed position.

Thus in a system which is sensitive to hydraulic hammer and yet which must be controlled through remote means, the external magnetic driving means 49 may be actuated by mechanical rotation or by electromagnetic rotation through known digital drive technology so as to rotate the magnetic field imposed upon the metering poppet magnetic drive 47. This in turn will rotate the metering poppet actuating screw 45 transitioning the metering poppet 21 to an open or a closed position depending upon the direction of rotation of the external magnetic driving means 49. The speed of rotation of the actuating screw and the transitioning of the poppet 21 may be at a speed convenient to the mechanical design and electrical or control limitations of the overall external magnetic driving means 49. The effect of the poppet 21 transitioning has been isolated from the hydraulic sensitivity of the system since the speed of opening and closing the valve 1 is a function, as stated before, of the design of the metering passage 35 and the metering poppet flow passage 23. This permits the designer to isolate the design effects and requirements of his control system, with its particular requirements for timing, mechanical responsiveness and strength, from his requirements for controlling the hydraulic pressure variances, shock loadings, and hydraulic hammering within his flow system. He may design a valve having a differential opening and closing times and independently design the responsiveness of the control mechanism, providing increased or enhanced flexibility in the selection of parameters and in the use of the valve in complex systems.

Likewise, the version of the valve shown in FIG. 5, has an actuating push-button diaphragm 19 for displacing the poppet 21 which is then locked open by the split clamping action of the actuating poppet lock clamp 59 and has a second push-button diaphragm 60 which, by means of the clamp actuating clamp 61 cams the lock clamp to a relatively open position about the fulcrum screw 60, causing the metering poppet 21 locking shoulder 57 to be released, returning the metering poppet 21 to the closed position by the force of the metering poppet return spring 25 and the fluid pressure in chamber 37. This variation described provides a two push-button valve which may be actuated on or off at will. The speed of actuation may be extremely variable, as in the case of a manually actuted valve where the reactions, responses, and forces imposed by the individual operating the valve determine the speed of the poppets 21's transition to the open or the closed position. The overall valve opening and closing times have been predetermined by the designer, and the overall hydraulic system involved is unaffected by the dynamics of the actuation itself.

Thus, as can be seen, the invention described in any of its principal embodiments and variants provides a simple, flexible metering valve structure which can be designed either to pass a controlled volume of liquid upon actuation or, alternately, within the same structure, provide controllable, independently designable turnon and turnoff times. The valve is hermetically sealed, requires no injection of air, requires no dual fluid interfaces. The valve further is amenable to a number of varying mechanical control means to provide the forces to actuate the valve.

Thus it can be seen that the invention described herein is not limited to the specific embodiments described above but rather to all the equivalents of these embodiments and it can be seen that there will be many equivalents obvious to those skilled in the art.

I claim:
1. A valve controlling fluid flow comprising:
    a. a valve body having an inlet and an outlet for fluid flow therethrough;
    b. a cylindrical divider within said body, having an end and having passages for fluid flow peripherally disposed along the sides of said divider;
    c. said divider dividing the valve body into an intake chamber and an outlet chamber;
    d. a convoluted cylindrical elastomeric diaphragm having one edge sealingly connected adjacent to the preiphery of the closed end of the cylinder divider extending along the interior walls of the cylinder divider sealingly adjacent to the passages, being convoluted inwardly;
    e. a diaphragm activating cup sealingly connected to the other end of the convoltued diaphragm forming thereby a metering chamber;
    f. a flow metering orifice within said activating cup;
    g. a dump means for dumping the fluid contents of the metering chamber to the exhaust chamber;
    h. a biasing means biasing said actuating cup towards a maximum size of the metering chamber.
2. A valve as described in claim 1 wherein the valve further comprises vertical guide means installed substantially vertically along the axis of the cylindrical divider substantially coaxially with the acutating cup passing therethrough, restricting thereby the movement of the actuating cup to substantially one dimension.
3. A valve as described in claim 1 wherein the dump means further comprises a movable poppet located within a mating sealing orifice having an open and a closed position, said poppet being connected to a flexible metal diaphragm in the valve body wall haing a resting position and a displaced position, corresponding to the poppet closed and the opened position respectively.
4. A valve as described in claim 3 above wherein the dump means further comprises an electromagnetic solenoid externally mounted upon the valve body, mechanically connected to the metal diaphragm, such that the actuation of the solenoid displaces the metal diaphragm from its resting position to its displaced position.
5. A valve as described in claim 3 wherein the moveable poppet further comprises:
    a. a stepping locking skirt upon the popped adjacent to the metal diaphragm;
    b. a displaceable spring clamping means having an opened and a closed position, displaceable by the movement of the stepped skirt as the poppet is actuated from a closed to an open position, springing to the closed position upon passage skirt, locking the poppet against return to the poppet closed position;
    b. a second displaceable diaphragm button having a resting and a displacing position;
    c. cam means internally connected to and actuated by the movement of the second diaphragm for expanding the clamp from the closed position to a second open position, unlatching the first poppet to return to the closed position.
6. A valve as described in claim 1 above wherein the dump means further comprises:
    a. a poppet located within a mating opening within the end of the cylindrical divider having an open and a closed position;
    b. a screw rotatably connected to saidd poppet mating with screwdriving means, rotating such that the screw transitions the poppet from the closed to the open position;
    c. a magnetic rotating means affixed to said screw for rotating the screw from a position corresponding to the closed position of the poppet to a position corresponding to the open position of the poppet.
7. A valve as described in claim 6 wherein the magnetic drive means further comprises:
    a. an axial torquable extension of the screw into the exhaust chamber of the valve;
    b. a fluid passing substantially open wheel orthoginally mounted on said extension wherein the wheel further comprises a series of alternating pool permanent magnetic elements circumferentially extending around and forming an angular rim;
    c. a multipole magnetic driving means exterior to the valve body, circumferentially positioned in a plane coextensive with the multiple magnetic driving wheel.

* * * * *